United States Patent
Ma et al.

(10) Patent No.: US 10,404,510 B2
(45) Date of Patent: *Sep. 3, 2019

(54) SYSTEMS AND METHODS FOR CONFIGURING CARRIERS USING OVERLAPPING SETS OF CANDIDATE NUMEROLOGIES

(71) Applicant: Huawei Technologies Co., Ltd., Shenzhen (CN)

(72) Inventors: Jianglei Ma, Ottawa (CA); Lu Rong, Shanghai (CN); Liqing Zhang, Ottawa (CA)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/105,798

(22) Filed: Aug. 20, 2018

(65) Prior Publication Data

US 2018/0359124 A1 Dec. 13, 2018

Related U.S. Application Data

(63) Continuation of application No. 15/096,795, filed on Apr. 12, 2016.

(Continued)

(51) Int. Cl.
*H04L 27/26* (2006.01)
*H04L 29/08* (2006.01)
*H04L 5/00* (2006.01)

(52) U.S. Cl.
CPC .......... *H04L 27/2607* (2013.01); *H04L 5/001* (2013.01); *H04L 5/0064* (2013.01);
(Continued)

(58) Field of Classification Search
CPC ... H04L 27/2607; H04L 5/0064; H04L 5/001; H04L 5/0092; H04L 27/2602; H04L 5/0094; H04L 69/323
See application file for complete search history.

(56) References Cited

U.S. PATENT DOCUMENTS 8,498,192 B2 7/2013 Bhushan et al.
9,210,706 B2 12/2015 Ye
(Continued)

FOREIGN PATENT DOCUMENTS

CN 101390328 A 3/2009
CN 101940024 A 1/2011
(Continued)

OTHER PUBLICATIONS

Intel Corporation, "UL-OFDM for EUTRA: Text proposal," 3GPP TSG RAN WG1 Meeting #42, R1-050742, Aug. 29-Sep. 2, 2005, London, UK.
(Continued)

*Primary Examiner* — Peter P Chau
(74) *Attorney, Agent, or Firm* — Slater Matsil, LLP

(57) ABSTRACT

It is possible to reduce the implementation complexity associated with dynamic carrier configuration by defining overlapping sets of candidate numerologies for at least some carriers in the network. A common numerology is included in sets of candidate numerologies pre-associated with two different carriers. This reduces the amount of numerologies that need to be supported by the corresponding user equipments (UEs) and base stations, which in turn reduces the complexity of those devices, e.g., less complex hardware, protocol stacks, and software, lower storage and processing requirements, etc. The common numerology specifies a common subset of physical layer parameters for both carriers. In one example, the common numerology specifies the same sub-carrier frequency spacing and symbol duration for both carriers. The common numerology may further specify the same cyclic prefix (CP) length for symbols communicated over both carriers.

26 Claims, 3 Drawing Sheets

Related U.S. Application Data

(60) Provisional application No. 62/245,710, filed on Oct. 23, 2015.

(52) U.S. Cl.
CPC .......... *H04L 5/0092* (2013.01); *H04L 5/0094* (2013.01); *H04L 27/2602* (2013.01); *H04L 69/323* (2013.01)

(56) References Cited

U.S. PATENT DOCUMENTS

| | | |
|---|---|---|
| 9,553,660 B2 | 1/2017 | Kishiyama et al. |
| 2007/0064669 A1 | 3/2007 | Classon et al. |
| 2007/0195690 A1 | 8/2007 | Bhushan et al. |
| 2007/0195740 A1 | 8/2007 | Bhushan et al. |
| 2007/0268812 A1 | 11/2007 | Yoon et al. |
| 2008/0039133 A1 | 2/2008 | Ma et al. |
| 2009/0185632 A1 | 7/2009 | Cai et al. |
| 2011/0032850 A1* | 2/2011 | Cai ................. H04L 5/0023 370/280 |
| 2011/0041027 A1 | 2/2011 | Fong et al. |
| 2011/0103308 A1 | 5/2011 | Lee et al. |
| 2013/0258936 A1 | 10/2013 | Choi et al. |
| 2014/0029562 A1 | 1/2014 | Kishiyama |
| 2015/0256308 A1 | 9/2015 | Ma et al. |
| 2016/0353370 A1 | 12/2016 | Choi et al. |
| 2017/0163463 A1 | 6/2017 | Werner et al. |
| 2018/0007673 A1 | 1/2018 | Fwu et al. |
| 2018/0241508 A1* | 8/2018 | Chervyakov ......... H04L 5/0051 |

FOREIGN PATENT DOCUMENTS

| | | |
|---|---|---|
| CN | 103518339 A | 1/2014 |
| CN | 103716889 A | 4/2014 |
| WO | 2012161080 A1 | 11/2012 |
| WO | 2014139562 A1 | 9/2014 |
| WO | 2015131827 A1 | 9/2015 |
| WO | 2015191367 A1 | 12/2015 |
| WO | 2016192644 A1 | 12/2016 |

OTHER PUBLICATIONS

Intel Corporation, "LTE Numerology Change for V2V/V2X Communication", 3GPP TSG RAN WG1 Meeting #82bis, R1-155327, Oct. 5-9, 2015, Malmo, Sweden.

Berardinelli, Gilberto et al.,"On the Design of a Radio Numerology for 5G Wide Area", XP055388590, ICWMC 2015: The Eleventh International Conference on Wireless and Mobile Communications, pp. 13-18.

Lenovo, et al., "Views on Next Generation Wireless Access", RWS-150002, 3GPP RAN Workshop on 5G, Sep. 2015, 13 Pages.

\* cited by examiner

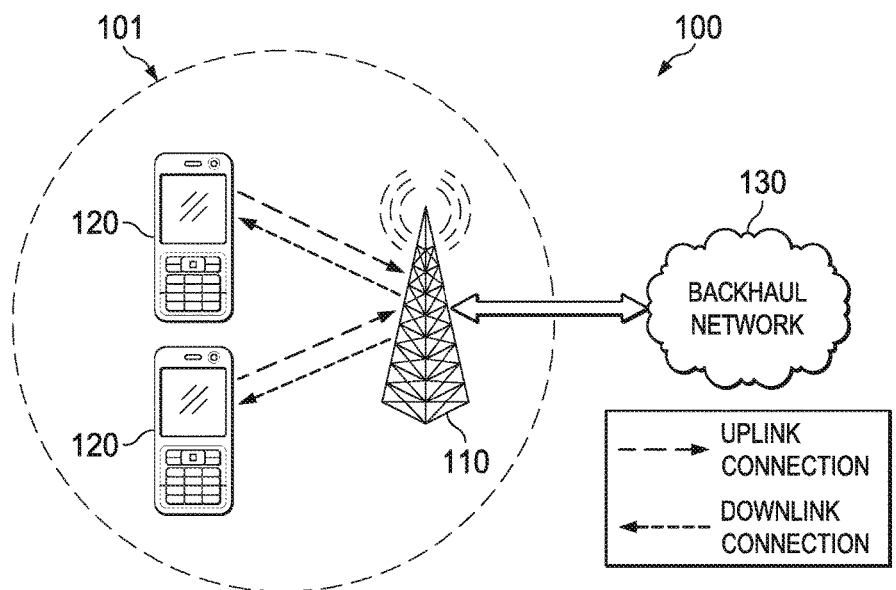
FIG. 1
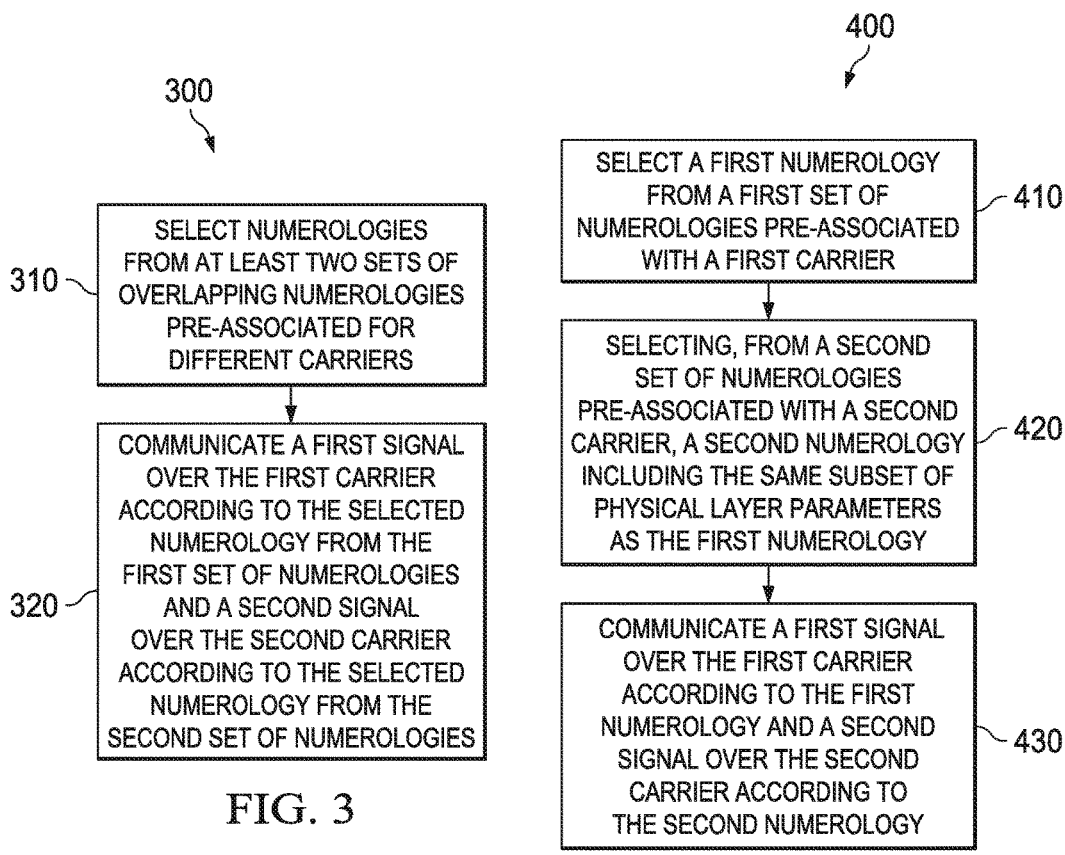
FIG. 3
FIG. 4

SYSTEMS AND METHODS FOR CONFIGURING CARRIERS USING OVERLAPPING SETS OF CANDIDATE NUMEROLOGIES

This patent application is a continuation of U.S. patent application Ser. No. 15/096,795 filed on Apr. 12, 2016 and entitled "Systems and Methods for Configuring Carriers Using Overlapping Sets of Candidate Numerologies," which claims priority to U.S. Provisional Application No. 62/245,710 filed on Oct. 23, 2015 and entitled "Systems and Methods for Configuring Carriers Using Overlapping Sets of Candidate Numerologies," both of which are hereby incorporated by reference as if reproduced in their entireties.

TECHNICAL FIELD

The present invention relates to wireless communications, and, in particular embodiments, to systems and methods for configuring carriers using overlapping sets of candidate numerologies.

BACKGROUND

Next-generation wireless networks will need to support diverse traffic types (e.g., voice, data, mobile-gaming), while providing high throughput rates over various, oftentimes changing, channel conditions. To achieve this, network devices may need to have the capability to configure different physical layer parameters on different carriers in an efficient, yet scalable, fashion. Accordingly, techniques and schemes for efficiently configuring physical layer parameters on multiple carriers are desired.

SUMMARY OF THE INVENTION

Technical advantages are generally achieved by embodiments of this disclosure which describe systems and methods for configuring carriers using overlapping sets of candidate numerologies.

In accordance with an embodiment, a method for configuring numerologies on carriers is provided. In this example, the method includes selecting a numerology from a first set of numerologies pre-associated with a first carrier and a numerology from a second set of numerologies pre-associated with a second carrier. At least one of the numerologies in both the first set of numerologies and the second set of numerologies include a common subset of physical layer parameters for communicating over the first carrier and the second carrier. The method further includes communicating a first signal over the first carrier according to the selected numerology from the first set of numerologies and a second signal over the second carrier according to the selected numerology from the second set of numerologies. An apparatus for performing this method is also provided.

In accordance with another embodiment, a method for configuring a common numerology on different carriers is provided. In this example, the method includes selecting a first numerology from a first set of numerologies pre-associated with a first carrier, and selecting a second numerology from a second set of numerologies pre-associated with a second carrier. Both the first numerology and the second numerology including a common subset of physical layer parameter. The method further includes communicating a first signal over the first carrier according to the first numerology and a second signal over the second carrier according to the second numerology. An apparatus for performing this method is also provided.

BRIEF DESCRIPTION OF THE DRAWINGS

For a more complete understanding of the present invention, and the advantages thereof, reference is now made to the following description taken in conjunction with the accompanying drawings, in which:

FIG. 1 is a diagram of an embodiment wireless network;

FIG. 3 is a flowchart of an embodiment method for configuring carriers using overlapping sets of candidate numerologies;

FIG. 4 is a flowchart of another embodiment method for configuring carriers using overlapping sets of candidate numerologies;

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 2:
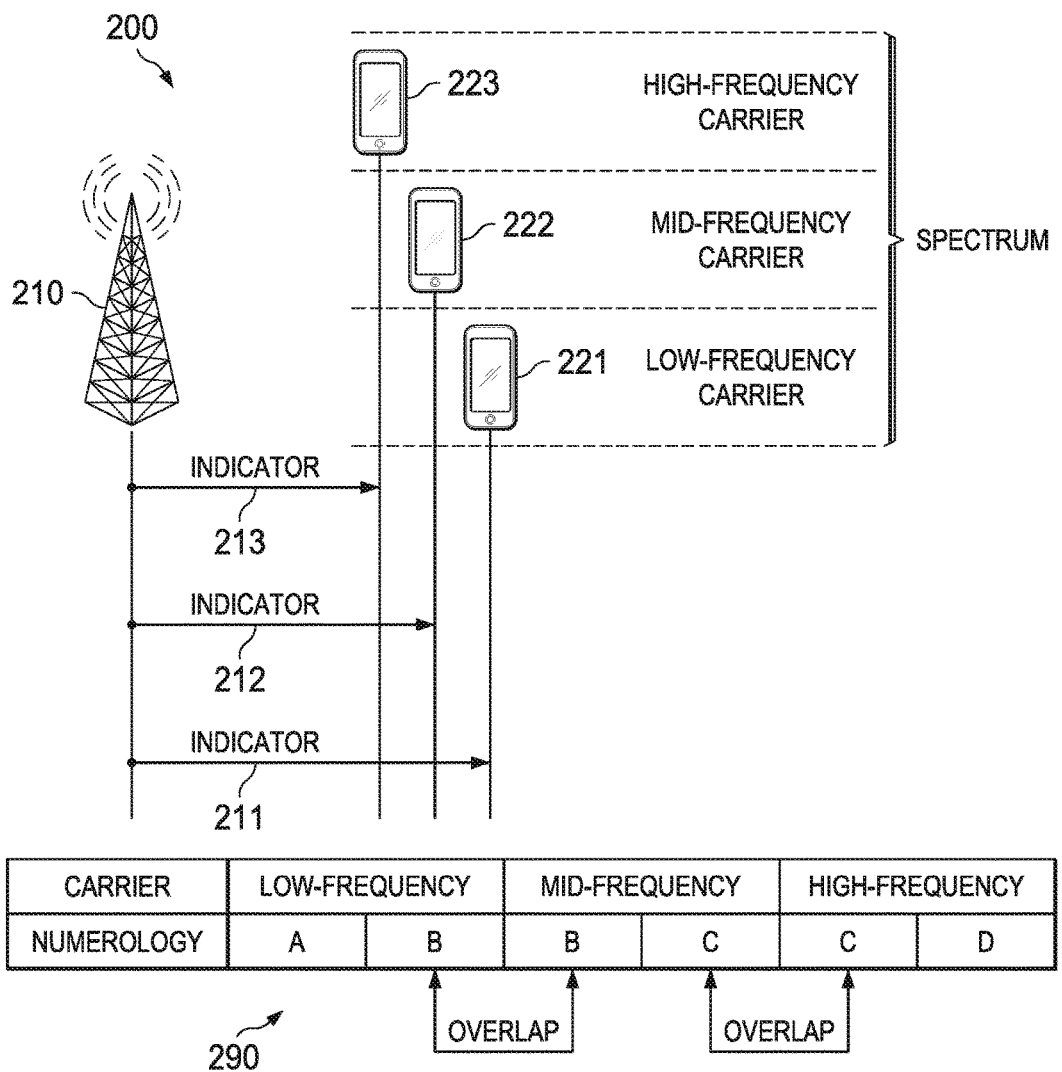
FIG. 2 is a protocol diagram of an embodiment communication sequence for configuring carriers using overlapping sets of candidate numerologies.

The making and using of embodiments of this disclosure are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The subset of physical layer parameters used to communicate a signal over a carrier are collectively referred to as the "numerology" of the carrier, and may include a combination, or subset, of a transmission time interval (TTI) used to transmit the signal over the carrier, a symbol duration of symbols transmitted over the carrier, a cyclic prefix (CP) length of symbols transmitted over the carrier, and a sub-carrier spacing between sub-carrier frequencies over which the signal is transmitted. Different numerologies may be pre-associated with carriers with different center frequency ranges.

Moreover, multiple candidate numerologies may be pre-associated with each carrier to achieve improved spectrum flexibility such that a given carrier can, for example, support different traffic types, be assigned to mobile devices traveling at different speeds, efficiently communicate data over different channel conditions, and/or be used for different transmission modes.

To support dynamic carrier configuration, a serving base station, or controller, may need to communicate control signaling to served UEs to notify the UEs of their assigned carriers, as well as to indicate which of the candidate numerologies pre-associated with that carrier will be used to communicate the data signal. Conventional approaches define different, non-overlapping, sets of candidate numerologies for each carrier. In one example, a conventional approach defines a set of three numerologies based on 3.75 kilohertz (kHz), 7.5 kHz, and 15 kHz sub-carrier spacings for a 1 GHz carrier, and a set of three numerologies on 30 kHz, 60 kHz, and 90 kHz sub-carrier spacings for a 5 GHz carrier. Defining separate, mutually exclusive, sets of candidate numerologies for each carrier may significantly increase the number of numerologies that need to be supported by the UEs and/or base stations, which increases the implementation complexity associated with dynamic carrier configuration.

Embodiments provided herein reduce the implementation complexity associated with dynamic carrier configuration by defining overlapping sets of candidate numerologies for at least some carriers in the network. More specifically, a common numerology is included in sets of numerologies pre-associated with two different carriers. This numerology overlap reduces the total number of numerologies that need to be supported by the UEs and/or base stations, which in turn reduces the complexity of those devices by allowing them to be designed with less complex hardware, protocol stacks, and/or software as well as with lower storage and processing requirements Reducing the total number of numerologies may reduce overhead because fewer control signaling bits would need to be transmitted to configure numerologies on the carriers. The common numerology specifies a common subset of physical layer parameters for both carriers. In one example, the common numerology specifies the same sub-carrier frequency spacing and symbol duration for both carriers. The common numerology may further specify the same cyclic prefix (CP) length for symbols communicated over both carriers. In some embodiments, the common numerology specifies the same TTI for signals communicated over both carriers. In other embodiments, the common numerology does not specify a TTI for the carriers, in which case signals communicated over the carriers in accordance with the common numerology may have different TTIs configured independently from the common numerology. In some embodiments, the base station sends explicit signaling instructions to the UEs that instruct the UEs to transmit or receive wireless signals over the carriers based on the selected numerologies. In other embodiments, the UEs infer the selected numerologies based on other signaling from the base station, e.g., based on a service or transmission mode, re-transmission mode, etc. These and other inventive aspects are described in greater detail below.

FIG. 1 is a diagram of a wireless network 100 for communicating data. The wireless network 100 includes a base station 110 having a coverage area 101, a plurality of UEs 120, and a backhaul network 130. As shown, the base station 110 establishes uplink (dashed line) and/or downlink (dotted line) connections with the UEs 120, which serve to carry data from the UEs 120 to the base station 110 and vice-versa. Data carried over the uplink/downlink connections may include data communicated between the UEs 120, as well as data communicated to/from a remote-end (not shown) by way of the backhaul network 130. As used herein, the term "base station" refers to any component (or collection of components) configured to provide wireless access to a network, such as an evolved NodeB (eNB), a macro-cell, a femtocell, a Wi-Fi access point (AP), or other wirelessly enabled devices. Base stations may provide wireless access in accordance with one or more wireless communication protocols, e.g., long term evolution (LTE), LTE advanced (LTE-A), High Speed Packet Access (HSPA), Wi-Fi 802.11a/b/g/n/ac. As used herein, the term "user equipment (UE)" refers to any component (or collection of components) capable of establishing a wireless connection with a base station. The terms "UE," "wireless device," and "mobile station (STA)" are used interchangeably throughout this disclosure. In some embodiments, the network 100 may comprise various other wireless devices, such as relays, low power nodes, etc.

Embodiments of this disclosure utilize overlapping numerologies to reduce the overhead and implementation complexity associated with dynamic carrier configuration.

FIG. 2 is a protocol diagram of an embodiment communication sequence 200 for dynamically configuring carriers using overlapping sets of candidate numerologies. In this example, a base station 210 assigns UEs 221, 222, 223 different spectrum resources. In particular, the UE 221 is assigned a low-frequency carrier, the UE 222 is assigned a mid-frequency carrier, and the UE 223 is assigned a high-frequency carrier. The low-frequency carrier has a lower center frequency than the mid-frequency carrier, and the mid-frequency carrier has a lower center frequency than the high frequency carrier.

The base station 210 also sends indicator messages 211, 212, 213 to the UEs 221, 222, 223 (respectively) to notify the UEs 211, 212, 213 which numerology will be configured over their assigned carrier. The indicator messages 211, 212, 213 may be communicated over the assigned carriers using, for example, a default numerology. Alternatively, the assigned carriers may be communicated to the UEs 211, 212, 213 via higher order signaling (e.g., radio resource control (RRC) signaling) or over a default/access carrier frequency. In some embodiments, the indicator messages 211, 212, 213 also notify the UEs 211, 212, 213 which carrier they have been assigned. In other embodiments, the carrier assignments are communicated to the UEs 211, 212, 213 using separate signaling. As yet another alternative, the numerologies may be implicitly signaled to the UE based on features of physical layer signals received from the base station 210. For example, numerologies may be determined based on a type and/or number of synchronization signals in a physical layer signal, a spreading sequence used to communicate the physical layer signal, or a type or number of reference signals (e.g., demodulation reference signals, cell-specific reference signals, user specific reference signals) in the physical layer signal. As yet another alternative, the numerologies may be determined via blind detection. For example, the UEs may try to transmit or receive a signal over the carrier based on different numerologies until one or more criteria is satisfied, e.g., a cyclic redundancy check (CRC) check verifies that a signal was correctly received according to a candidate numerology.

As demonstrated by the table 290, each of the three carriers are pre-associated with two numerologies. In particular, the low-frequency carrier is pre-associated with numerologies A and B, the mid-frequency carrier is pre-associated with numerologies B and C, and the high-frequency carrier is pre-associated with numerologies C and D. Notably, the numerology B can be configured on both the low-frequency carrier and the mid-frequency carrier, and the numerology C can be configured on both the mid-frequency carrier and the high-frequency carrier. This numerology overlap reduce the total number of numerologies that need to be supported by the UE and/or eNB, which in turn reduces the complexity of those devices, e.g., less complex hardware, protocol stacks, and software, lower storage and processing requirements, etc.

It should be appreciated that the overlapping numerology configuration in table 290 is one example of the many possible embodiment overlapping numerology configurations, and that different embodiment overlapping numerology configurations may provide varying levels of complexity reduction. It should also be appreciated that embodiment overlapping numerology configurations may pre-associate different numbers of numerologies with different numbers of carriers (e.g., two carriers, four carriers, five carriers, etc.), as well provide varying degrees of numerology overlap between carriers. For example, an embodiment numerology configuration may pre-associate two or more common numerologies between two or more adjacent carriers. It should also be appreciated that common numerologies may be pre-associated with non-adjacent carriers.

Table 1 lists candidate numerologies for two different ranges of carrier center frequencies. In this example, a set of three candidate numerologies based on 3.75 kHz, 7.5 kHz, and 15 kHz sub-carrier spacings are pre-associated with carriers with center frequencies between 0.6 GHz and 3 GHz, and a set of three candidate numerologies based on 15 kHz, 30 kHz, and 60 kHz sub-carrier spacings are pre-associated with carriers with center frequencies between 3 GHz and 6 GHz. The candidate numerology based on the 15 kHz sub-carrier spacing is common to both sets of candidate numerologies pre-associated with the respective carrier ranges listed in Table 1.

TABLE 1

| Center Frequency | 0.6~3 GHz | | | 3~6 GHz | | |
|---|---|---|---|---|---|---|
| SC Spacing (kHz) | 3.75 | 7.5 | 15 | 15 | 30 | 60 |
| Symbol Duration ($\mu$s) | 266.67 | 133.33 | 66.67 | 66.67 | 33.33 | 16.67 |
| Symbols per TTI | 7(3/4) | 7(3/4) | 7(3/4) | 7(3/4) | 7 (3/4) | 7 (3/4) |
| CP length ($\mu$s) | 16.67/20.83 | 8.33/10.42 | 4.17/5.21 | 4.17/5.21 | 2.08/2.60 | 1.04/1.30 |
| CP overhead | 6.67% | 6.67% | 6.67% | 6.67% | 6.67% | 6.67% |
| TTI Length (ms) | 2 | 1 | 0.5 | 0.5 | 0.25 | 0.125 |

Table 2 lists candidate numerologies for three different ranges of carrier center frequencies. In this example, a set of three candidate numerologies based on 3.75 kHz, 7.5 kHz, and 15 kHz sub-carrier spacings are pre-associated with carriers with a center frequency between 0.6 GHz and 2 GHz, a set of two candidate numerologies based on 15 kHz and 30 kHz sub-carrier spacings are pre-associated with carriers with a center frequency between 2 GHz and 4 GHz, and a set of two candidate numerologies based on 30 kHz and 60 kHz sub-carrier spacings are pre-associated with carriers with center frequencies between 4 GHz and 6 GHz. The candidate numerology based on the 15 kHz sub-carrier spacing is common to the set of candidate numerologies pre-associated with carriers with center frequencies between 0.6 GHz and 2 GHz and the set of candidate numerologies pre-associated with carriers with center frequencies between 2 GHz and 4 GHz. Similarly, the candidate numerology based on the 30 kHz sub-carrier spacing is common to the set of candidate numerologies pre-associated with carriers with center frequencies between 2 GHz and 4 GHz and the set of candidate numerologies pre-associated with carriers with center frequencies between 4 GHz and 6 GHz.

TABLE 2

| Center Frequency | 0.6~2 GHz | | | 2~4 GHz | | 4~6 GHz | |
|---|---|---|---|---|---|---|---|
| SC Spacing (kHz) | 3.75 | 7.5 | 15 | 15 | 30 | 30 | 60 |
| Symbol Duration ($\mu$s) | 266.67 | 133.33 | 66.67 | 66.67 | 33.33 | 33.33 | 16.67 |
| Symbols per TTI | 7(3/4) | 7(3/4) | 7(3/4) | 7(3/4) | 7 (3/4) | 7 (3/4) | 7 (3/4) |
| CP length ($\mu$s) | 16.67/20.83 | 8.33/10.42 | 4.17/5.21 | 4.17/5.21 | 2.08/2.60 | 2.08/2.60 | 1.04/1.30 |
| CP overhead | 6.67% | 6.67% | 6.67% | 6.67% | 6.67% | 6.67% | 6.67% |
| TTI Length (ms) | 2 | 1 | 0.5 | 0.5 | 0.25 | 0.25 | 0.125 |

Table 3 lists candidate numerologies for three different ranges of carrier center frequencies. In this example, a set of three candidate numerologies based on 3.75 kHz, 7.5 kHz, and 15 kHz sub-carrier spacings are pre-associated with carriers with a center frequency between 0.6 GHz and 3 GHz, a set of two candidate numerologies based on 15 kHz and 30 kHz sub-carrier spacings are pre-associated with carriers with a center frequency between 3 GHz and 6 GHz, and a set of two candidate numerologies based on 30 kHz and 60 kHz sub-carrier spacings are pre-associated with carriers with a center frequency between 6 GHz and 60 GHz. The candidate numerology based on the 15 kHz sub-carrier spacing is common to the set of candidate numerologies pre-associated with carriers with center frequencies between 0.6 GHz and 3 GHz and the set of candidate numerologies pre-associated with carriers with center frequencies between 3 GHz and 6 GHz. Similarly, the candidate numerology based on the 30 kHz sub-carrier spacing is common to the set of candidate numerologies pre-associated with carriers with center frequencies between 3 GHz and 6 GHz and the set of candidate numerologies pre-associated with carriers with center frequencies between 6 GHz and 60 GHz.

TABLE 3

| Center Frequency | 0.6~3 GHz | | | 3~6 GHz | | 6~60 GHz | |
| --- | --- | --- | --- | --- | --- | --- | --- |
| SC Spacing (kHz) | 3.75 | 7.5 | 15 | 15 | 30 | 30 | 60 |
| Symbol Duration (μs) | 266.67 | 133.33 | 66.67 | 66.67 | 33.33 | 33.33 | 16.67 |
| Symbols per TTI | 7(3/4) | 7(3/4) | 7(3/4) | 7(3/4) | 7 (3/4) | 7 (3/4) | 7 (3/4) |
| CP length (μs) | 16.67/20.83 | 8.33/10.42 | 4.17/5.21 | 4.17/5.21 | 2.08/2.60 | 2.08/2.60 | 1.04/130 |
| CP overhead | 6.67% | 6.67% | 6.67% | 6.67% | 6.67% | 6.67% | 6.67% |
| TTI Length (ms) | 2 | 1 | 0.5 | 0.5 | 0.25 | 0.25 | 0.125 |

It should be appreciated that the overlapping sets of candidate numerologies pre-associated with carrier center frequency ranges listed in Tables 1-3 are provided as examples, and that other embodiments may use different overlapping sets of candidate numerologies for those carrier center frequency ranges, or for other carrier center frequency ranges.

FIG. 3 is a flowchart of an embodiment method 300 for configuring carriers using overlapping sets of candidate numerologies, as may be performed by a network device. At step 310, the network device selects numerologies from two or more sets of overlapping numerologies pre-associated with different carriers. The numerologies may be selected based on one or more criteria, such as traffic characteristics of data communicated over the carriers, transmission modes used to communicate data over the carriers (e.g., single transmit point (TP) transmission, multi TP transmission), channel characteristics of wireless links used to transport data communicated over the carriers, and/or mobility speeds of UEs scheduled to communicate data over the carriers. Traffic characteristics used to select the numerology may include any characteristic associated with a traffic flow communicated over the carrier, such as a quality of service (QoS) requirement of the traffic flow (e.g., latency, packet loss rate), an average packet size in the traffic flow, a traffic type associated with the traffic flow, and an amount of data (e.g., number of bits) carried in the traffic flow. Channel characteristics used to select the numerology may include any characteristic associated with a wireless link used to transport data over the carrier, such as a multipath delay, path loss, or channel fading characteristic of the wireless link.

At step 320, the network device concurrently communicates over the first carrier according to the selected numerology from the first set of numerologies and over the second carrier according to the selected numerology from the second set of numerologies. In some embodiments, the network device sends one or more instructions to one or more UEs. The instructions instruct the UEs to transmit or receive wireless signals over the carriers based on the selected numerologies. The network device may send different instructions to UEs scheduled to transmit or receive data over different carriers. Alternatively, the network device may send the same instruction to each of the one or more UEs. In one embodiment, a single UE is scheduled to transmit and/or receive data over multiple carriers. In that embodiment, the network device may communicate the same instruction, or different instructions, to the single UE.

FIG. 4 is a flowchart of an embodiment method 400 for configuring an overlapping numerology on two carriers, as may be performed by a network device. At step 410, the network device selects a first numerology from a first set of numerologies pre-associated with a first carrier. At step 420, the network device selects a second numerology from a second set of numerologies pre-associated with a second carrier. The first numerology and the second numerology include the same subset of physical layer parameters as one another. At step 430, the network device concurrently communicates over the first carrier according to the first numerology and over the second carrier according to the second numerology. In some embodiments, the network device also sends at least one instruction to one or more UEs. The at least one instruction instructs the one or more UEs to send or receive wireless signals over the first carrier in accordance with the first numerology and over the second carrier in accordance with the second numerology.

The two or more sets of overlapping numerologies may include a first set of numerologies pre-associated with a first carrier and a second set of numerologies pre-associated with a second carrier. The first set of numerologies and the second set of numerologies include at least one common numerology specifying the same subset of physical layer parameters for both the first carrier and the second carrier. The common numerology may specify the same sub-carrier frequency spacing and symbol duration for the first carrier and the second carrier. The common numerology may further specify the same cyclic prefix (CP) length for symbols communicated over the first carrier and the second carrier. In some embodiments, the common numerology specifies the same TTI for the first carrier and the second carrier. In other embodiments, the common numerology does not specify a TTI for the carriers, in which case signals communicated over the carrier in accordance with the common numerology may have different TTIs. In some embodiments, the common numerology further specifies the number of symbols per TTI for the first carrier and the second carrier. In some embodiments, the common numerology further specifies the CP overhead for the first carrier and the second carrier. In some embodiments, the common numerology is selected for the first carrier and the second carrier. In such embodiments, the same subset of physical layer parameters is used to communicate signals over the first carrier and the second carrier. In other embodiments, other numerologies are selected for the first carrier and/or the second carrier, in which case different sets of physical layer parameters are used to communicate signals over the respective carriers.

In some embodiments, the two or more sets of overlapping numerologies may further include a third set of numerologies pre-associated with a third carrier, with the center frequency of the second carrier being in-between the center frequencies of the first carrier and the third carrier. The third set of numerologies may overlap with the second set of numerologies such that another common numerology is included in both the second and third sets of numerologies. Examples of such an embodiment are listed in Tables 2 and 3.

The instructions sent to the one or more UEs may comprise an indicator that identifies which carrier has been selected, as well as an indicator that identifies which numerology has been selected. The indicator that identifies which numerology has been selected may include one or more bits in a control signaling message/packet. The overlapping numerologies may be represented by a fewer number of bits than non-overlapping numerologies having equivalent numbers of candidate numerologies for each carrier, because the same value can be used to represent the common numerology for each corresponding carrier.

Figure 5:
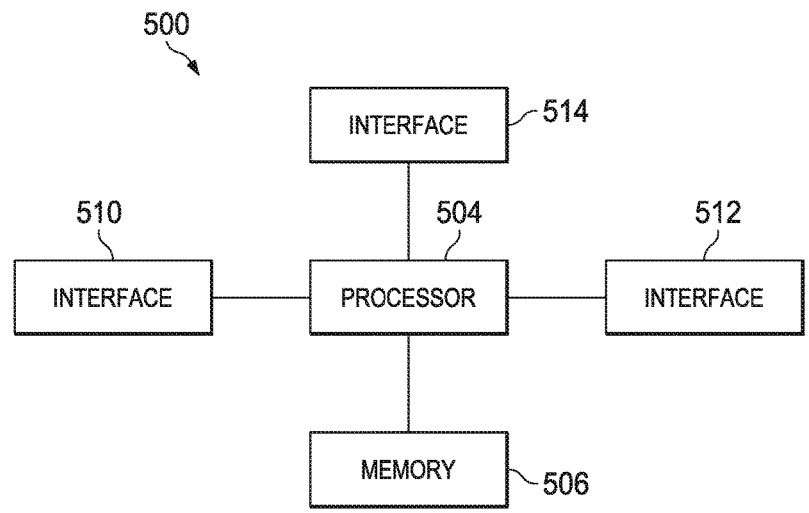
FIG. 5 is a diagram of an embodiment processing system.

FIG. 5 is a block diagram of an embodiment processing system 500 for performing methods described herein, which may be installed in a host device. As shown, the processing system 500 includes a processor 504, a memory 506, and interfaces 510-514, which may (or may not) be arranged as shown in FIG. 5. The processor 504 may be any component or collection of components adapted to perform computations and/or other processing related tasks, and the memory 506 may be any component or collection of components adapted to store programming and/or instructions for execution by the processor 504. In an embodiment, the memory 506 includes a non-transitory computer readable medium. The interfaces 510, 512, 514 may be any component or collection of components that allow the processing system 500 to communicate with other devices/components and/or a user. For example, one or more of the interfaces 510, 512, 514 may be adapted to communicate data, control, or management messages from the processor 504 to applications installed on the host device and/or a remote device. As another example, one or more of the interfaces 510, 512, 514 may be adapted to allow a user or user device (e.g., personal computer (PC), etc.) to interact/communicate with the processing system 500. The processing system 500 may include additional components not depicted in FIG. 5, such as long term storage (e.g., non-volatile memory, etc.).

In some embodiments, the processing system 500 is included in a network device that is accessing, or part otherwise of, a telecommunications network. In one example, the processing system 500 is in a network-side device in a wireless or wireline telecommunications network, such as a base station, a relay station, a scheduler, a controller, a gateway, a router, an applications server, or any other device in the telecommunications network. In other embodiments, the processing system 500 is in a user-side wireless device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 6:
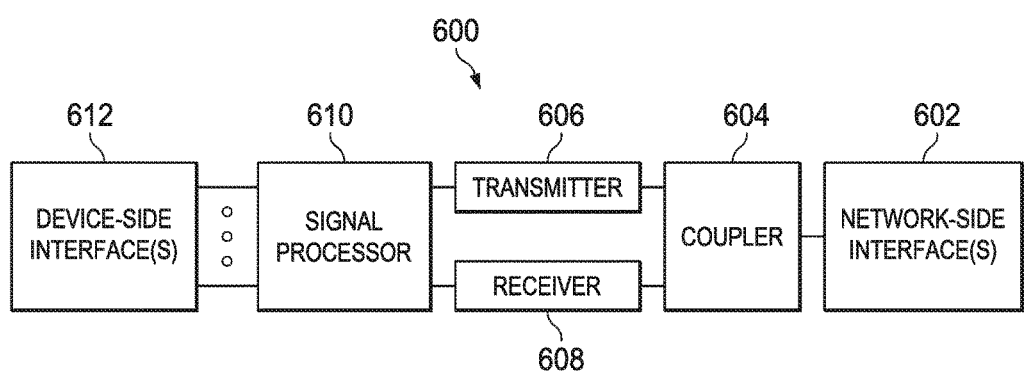
FIG. 6 is a diagram of an embodiment transceiver.

In some embodiments, one or more of the interfaces 510, 512, 514 connects the processing system 500 to a transceiver adapted to transmit and receive signaling over the telecommunications network. FIG. 6 is a block diagram of a transceiver 600 adapted to transmit and receive signaling over a telecommunications network. The transceiver 600 may be installed in a host device. As shown, the transceiver 600 comprises a network-side interface 602, a coupler 604, a transmitter 606, a receiver 608, a signal processor 610, and a device-side interface 612. The network-side interface 602 may include any component or collection of components adapted to transmit or receive signaling over a wireless or wireline telecommunications network. The coupler 604 may include any component or collection of components adapted to facilitate bi-directional communication over the network-side interface 602. The transmitter 606 may include any component or collection of components (e.g., up-converter, power amplifier, etc.) adapted to convert a baseband signal into a modulated carrier signal suitable for transmission over the network-side interface 602. The receiver 608 may include any component or collection of components (e.g., down-converter, low noise amplifier, etc.) adapted to convert a carrier signal received over the network-side interface 602 into a baseband signal. The signal processor 610 may include any component or collection of components adapted to convert a baseband signal into a data signal suitable for communication over the device-side interface(s) 612, or vice-versa. The device-side interface(s) 612 may include any component or collection of components adapted to communicate data-signals between the signal processor 610 and components within the host device (e.g., the processing system 500, local area network (LAN) ports, etc.).

The transceiver 600 may transmit and receive signaling over any type of communications medium. In some embodiments, the transceiver 600 transmits and receives signaling over a wireless medium. For example, the transceiver 600 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 602 comprises one or more antenna/radiating elements. For example, the network-side interface 602 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 500 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Although this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for wireless communication, the method comprising:
communicating a first signal according to a first sub-carrier spacing of a first set of sub-carrier spacings associated with a first range of carrier center frequencies, the first set of sub-carrier spacings comprising the first sub-carrier spacing and a second sub-carrier spacing different from the first sub-carrier spacing,
wherein one of the first sub-carrier spacing or the second sub-carrier spacing is the same as a third sub-carrier spacing of a second set of sub-carrier spacings, the second set of sub-carrier spacings associated with a second range of carrier center frequencies different from the first range of carrier center frequencies, the second set of sub-carrier spacings further comprising a fourth sub-carrier spacing different from both the first and second sub-carrier spacings.

2. The method of claim 1, wherein the third sub-carrier spacing is 15 kHz.

3. The method of claim 1, wherein the third sub-carrier spacing is 30 kHz.

4. The method of claim 1, wherein the third sub-carrier spacing is the same as the second sub-carrier spacing.

5. The method of claim 1, wherein the first range of carrier center frequencies is between 0.6 GHz and 3 GHz, or between 3 GHz and 6 GHz.

6. The method of claim 1, wherein the second range of carrier center frequencies is between 6 GHz and 60 GHz.

7. An apparatus comprising:
a processor; and
a computer readable storage medium storing programming for execution by the processor, the programming including instructions to:
communicate a first signal according to a first sub-carrier spacing of a first set of sub-carrier spacings associated with a first range of carrier center frequencies, the first set of sub-carrier spacings comprising the first sub-carrier spacing and a second sub-carrier spacing different from the first sub-carrier spacing,
wherein one of the first sub-carrier spacing or the second sub-carrier spacing is the same as a third sub-carrier spacing of a second set of sub-carrier spacings, the second set of sub-carrier spacings associated with a second range of carrier center frequencies different from the first range of carrier center frequencies, the second set of sub-carrier spacings further comprising a fourth sub-carrier spacing different from both the first and second sub-carrier spacings.

8. The apparatus of claim 7, wherein the third sub-carrier spacing is the same as the second sub-carrier spacing.

9. The apparatus of claim 7, wherein the third sub-carrier spacing is 15 kHz.

10. The apparatus of claim 7, wherein the third sub-carrier spacing is 30 kHz.

11. The apparatus of claim 7, wherein the first range of carrier center frequencies is between 0.6 GHz and 3 GHz, or between 3 GHz and 6 GHz.

12. The apparatus of claim 7, wherein the second range of carrier center frequencies is between 6 GHz and 60 GHz.

13. The apparatus of claim 7, wherein the apparatus is a user equipment.

14. The apparatus of claim 7, wherein the apparatus is a network device.

15. A method for wireless communication, the method comprising:
receiving, by a user equipment (UE), an indication of a first sub-carrier spacing of a first set of sub-carrier spacings associated with a first range of carrier center frequencies, the first set of sub-carrier spacings comprising the first sub-carrier spacing and a second sub-carrier spacing different from the first sub-carrier spacing,
wherein one of the first sub-carrier spacing or the second sub-carrier spacing is the same as a third sub-carrier spacing of a second set of sub-carrier spacings, the second set of sub-carrier spacings associated with a second range of carrier center frequencies different from the first range of carrier center frequencies, the second set of sub-carrier spacings further comprising a fourth sub-carrier spacing different from both the first and second sub-carrier spacings; and
communicating, by the UE, a first signal according to the first sub-carrier spacing.

16. The method of claim 15, wherein the third sub-carrier spacing is 15 kHz.

17. The method of claim 15, wherein the third sub-carrier spacing is 30 kHz.

18. The method of claim 15, wherein the first range of carrier center frequencies is between 0.6 GHz and 3 GHz, or between 3 GHz and 6 GHz.

19. The method of claim 15, wherein the second range of carrier center frequencies is between 6 GHz and 60 GHz.

20. The method of claim 15, wherein the third sub-carrier spacing is the same as the second sub-carrier spacing.

21. A method for wireless communication, the method comprising:
transmitting, by a network device, an indication of a first sub-carrier spacing of a first set of sub-carrier spacings associated with a first range of carrier center frequencies, the first set of sub-carrier spacings comprising the first sub-carrier spacing and a second sub-carrier spacing different from the first sub-carrier spacing,
wherein one of the first sub-carrier spacing or the second sub-carrier spacing is the same as a third sub-carrier spacing of a second set of sub-carrier spacings, the second set of sub-carrier spacings associated with a second range of carrier center frequencies different from the first range of carrier center frequencies, the second set of sub-carrier spacings further comprising a fourth sub-carrier spacing different from both the first and second sub-carrier spacings; and communicating a first signal according to the first sub-carrier spacing.

22. The method of claim 21, wherein the third sub-carrier spacing is 15 kHz.

23. The method of claim 21, wherein the third sub-carrier spacing is 30 kHz.

24. The method of claim 21, wherein the third sub-carrier spacing is the same as the second sub-carrier spacing.

25. The method of claim 21, wherein the first range of carrier center frequencies is between 0.6 GHz and 3 GHz, or between 3 GHz and 6 GHz.

26. The method of claim 21, wherein the second range of carrier center frequencies is between 6 GHz and 60 GHz.

* * * * *